Aug. 3, 1954

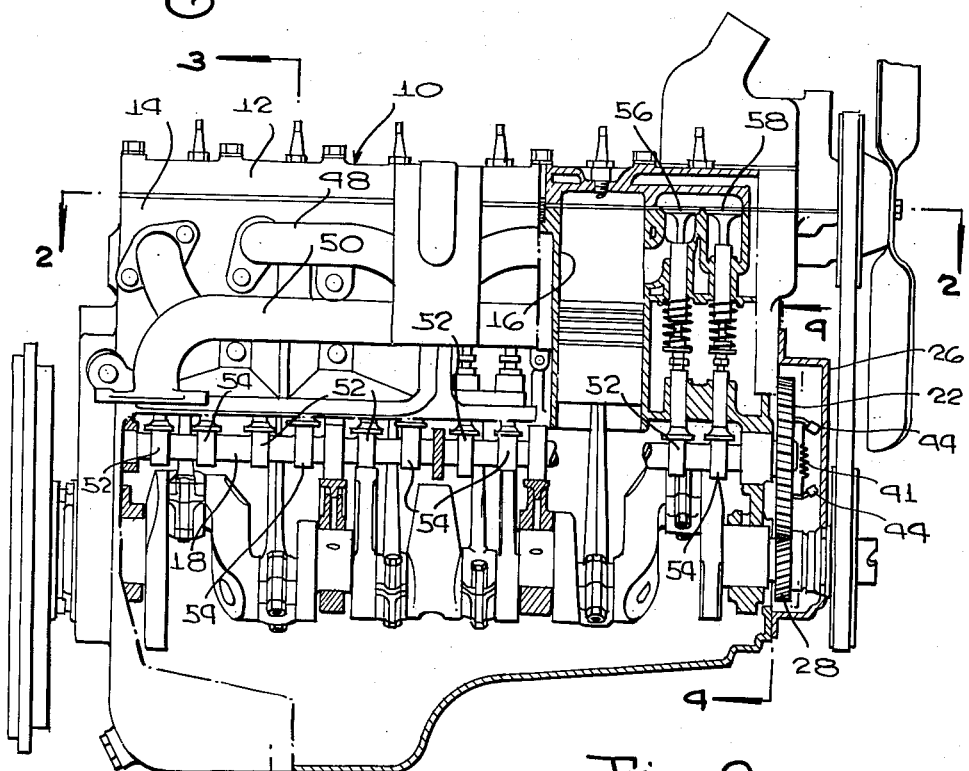

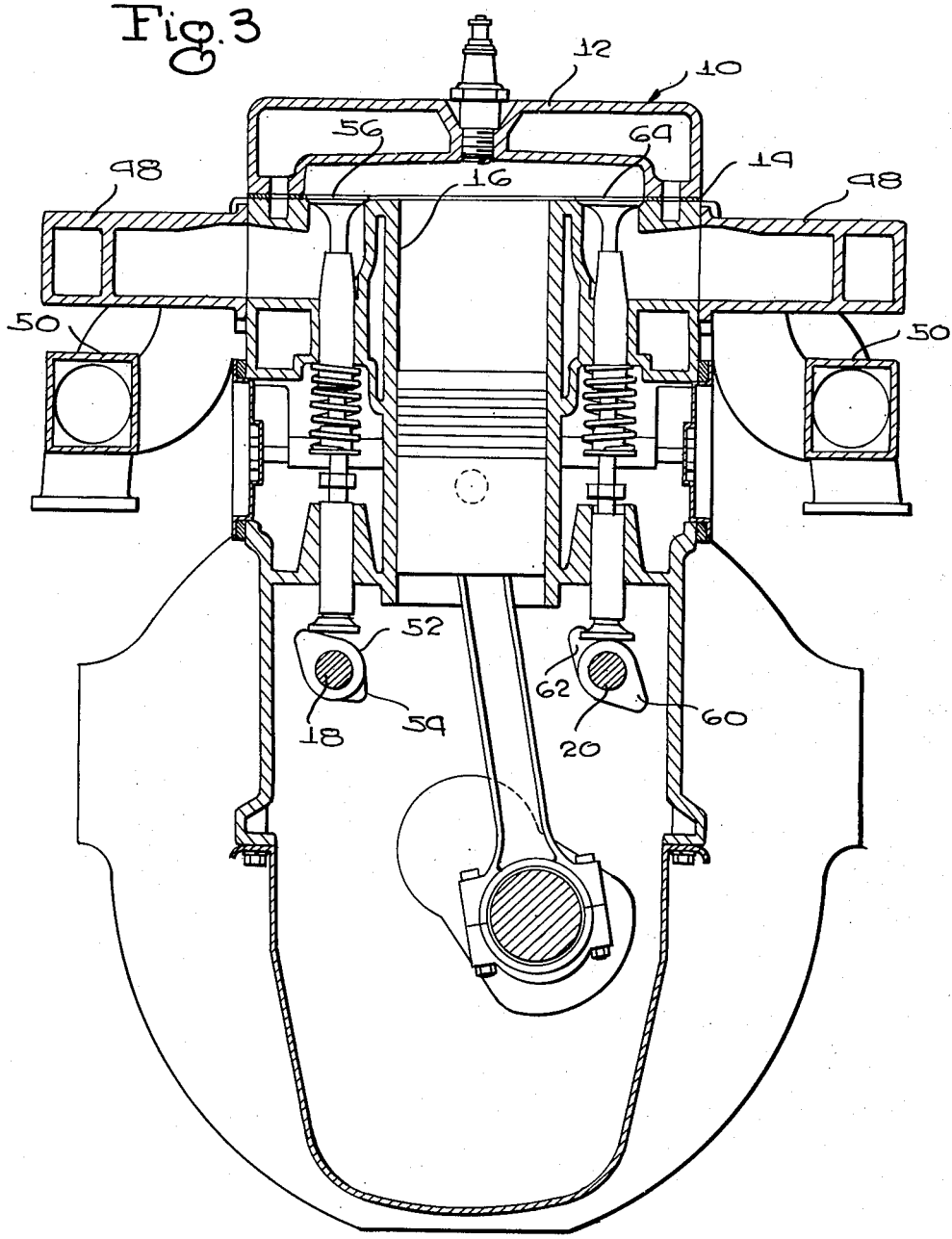

R. A. MacGREGOR 2,685,281

VARIABLE VALVE TIMING ASSEMBLY FOR
INTERNAL-COMBUSTION ENGINES

Filed July 24, 1953

INVENTOR.
ROBERT A. MacGREGOR
BY
McMorrow, Berman & Davidson
ATTORNEYS

Patented Aug. 3, 1954

2,685,281

UNITED STATES PATENT OFFICE 2,685,281

VARIABLE VALVE TIMING ASSEMBLY FOR INTERNAL-COMBUSTION ENGINES

Robert A. MacGregor, St. Paul, Minn.

Application July 24, 1953, Serial No. 370,006

2 Claims. (Cl. 123—90)

It is well established that the valve timing incorporated in the design of a poppet valve internal combustion engine as used in an automobile is a compromise demanded by the flexibility requirements. Torque and performance at low R. P. M. (and hence, relatively low gas velocities, intake and exhaust) call for late intake and exhaust valve opening, short valve-open overlap, and hence short valve-open time. At higher gas velocities, occurring concurrently with high R. P. M., the engine performance can be much improved by earlier intake and exhaust valve opening, longer valve-open period and hence longer valve-open overlap. If, then, the valve timing could be advanced in proportion to R. P. M. increase, and the valve-open time lengthened, the design compromise presently resorted to would be eliminated, and substantial improvement in engine performance would result.

The broad object of the present invention is to provide a valve timing means wherein the valve timing is varied in the manner discussed above, thus to achieve the desirable results noted.

Summarized briefly, the invention comprises the association, with each engine cylinder, of two pairs of valves, each pair including one intake and one exhaust valve. Each pair is controlled by a separate cam shaft, and drive means for the cam shaft is provided, effective to advance the opening of the intake and exhaust valves of one cam shaft simultaneously with corresponding retardation of the opening of the intake and exhaust valves of the other cam shaft, said advancement and retardation occurring in proportion to R. P. M. increases.

A secondary object is to incorporate, in the means for effecting the simultaneous advancement and retardation of the cam shafts, a centrifugally controlled drive transmitting means for each cam shaft, that can be incorporated in present day engine designs with minimum difficulty.

Other objects will appear from the following description, the claims appended thereto, and from the annexed drawings, in which like reference characters designate like parts throughout the several views, and wherein:

Figure 1 is a view partly in side elevation and partly in longitudinal section, through an internal combustion engine equipped with the variable valve timing means constituting the present invention;

Figure 2 is a plan sectional view through said engine taken on line 2—2 of Figure 1;

Figure 3 is a greatly enlarged transverse sectional view, through one of the engine cylinders and its associated valve means, taken substantially on line 3—3 of Figure 1;

Figure 4:
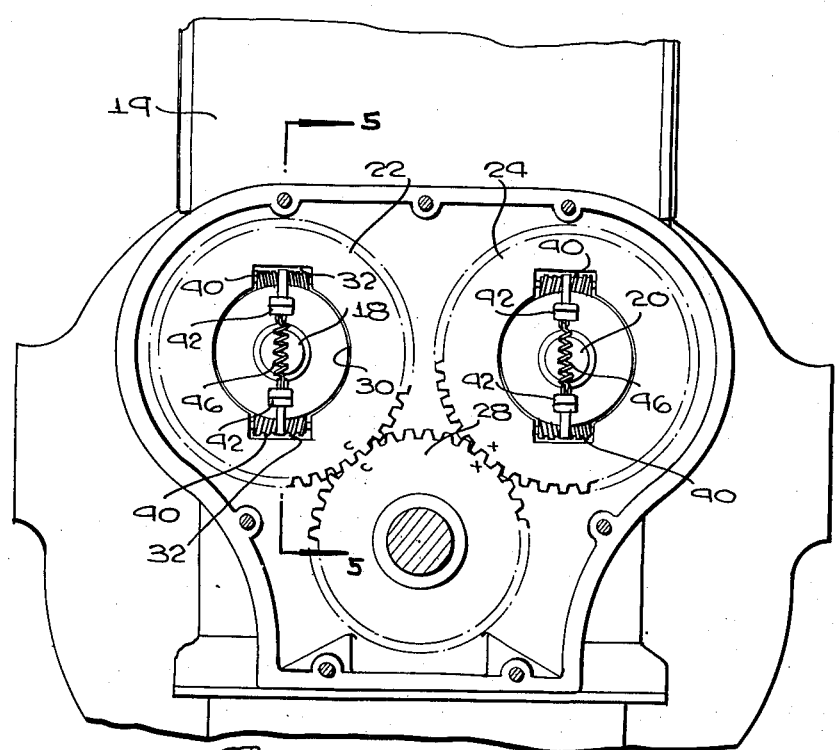
Figure 4 is an enlarged transverse sectional view on line 4—4 of Figure 1, showing the drive means for the cam shafts in front elevation.

The reference numeral 10 has been applied generally in the drawings to an internal combustion engine, having a cylinder head 12, a cylinder block 14, and cylinders 16.

In accordance with the present invention, two cam shafts are incorporated in the engine, one of these being a right cam shaft and being designated by the reference numeral 18, and the other being a left cam shaft and being designated by the reference numeral 20.

The right cam shaft 18 has associated therewith a right cam shaft gear 22, the left cam shaft 20 being driven through the medium of a left cam shaft gear 24. A gear cover 26 protectively encloses both cam shaft gears.

As shown in Figure 4, the cam shaft gears are disposed in side by side relation, with both gears being in mesh at their peripheries with a single crank shaft gear 28. Both cam shaft gears are, of course, driven in the same direction, and as shown in Figure 4, timing marks can be provided on the crank shaft gear and on the respective cam shaft gears, to insure the proper positioning of the several gears relative to one another.

The means whereby rotation is transmitted to the respective cam shafts is the same in both instances, and hence, the description of the drive means of cam shaft 18 will suffice for cam shaft 20.

Figure 5:
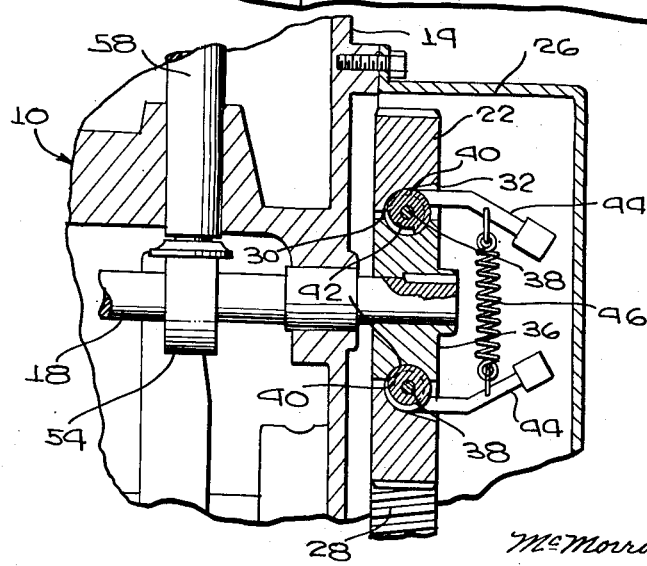
Figure 5 is a detail sectional view, the scale being enlarged still further, of one of the cam shaft drive mechanisms, taken on line 5—5 of Figure 4.

As will be observed from Figures 4 and 5, the cam shaft gear 22 has a large center opening 30, and disposed diametrically opposite one another in communication with said center opening are worm wheel recesses 32.

Disposed within and substantially filling the center opening 30 is a hub 36 keyed or otherwise secured to the cam shaft 18 for rotation therewith. A worm wheel shaft 38 has its ends engaged in opposite ends of each recess 32, and rotating on said worm wheel shaft is a worm wheel 40.

Each of the diametrically opposite worm wheels 40 is in mesh with teeth 42 formed in diametrically opposite peripheral recesses of the hub 36. Since the worm wheels extend into the recesses of the hub as well as into the recesses of the cam shaft gear, the worm wheels interengage the hub and gear for joint rotation.

Secured to each worm wheel 40, and projecting forwardly from the hub and cam shaft gear, are angular bob weights 44, said weights converging in a direction away from the worm wheels and being connected, intermediate their ends, by a spring 46.

By reason of the construction so far illustrated and described, it will be apparent that on rotation of the crank shaft gear 28, the gears 22, 24 will be rotated in the same direction. Through the interlock constituted by the worm wheels, rotation of the hubs with the cam shaft gears will be effected.

As the R. P. M. of the engine increases, the bob weights 44 will swing outwardly, in proportion to the number of revolutions per minute. The spring 46, of course, is used to balance the centrifugal forces acting upon the bob weights.

Movement of the bob weights 44 outwardly from one another is effective to transmit rotational movement to the worm wheels, and rotational movement of the worm wheels will, in turn, be effective to rotate each hub slightly relative to its associated cam shaft gear, due to the meshing of teeth 42 with the worm wheels.

It is important to note, in this regard, that the worm wheels associated with cam shaft 18 and cam shaft gear 22 are pitched in such a way as to cause the hub of one cam shaft to be rotated in one direction relative to its associated cam shaft gear, and the hub of the other cam shaft to be rotated in an opposite direction relative to its associated cam shaft gear.

This arrangement is designed to effect the advance of one cam shaft simultaneously with the retardation of the timing of the other cam shaft, with the simultaneous advance and retardation of the cam shafts occurring in direct ratio to the increase in revolutions per minute of the engine.

Referring to Figures 1 and 2, intake manifolds 48 are provided at both sides of the engine, and exhaust manifolds 50 are also provided at both sides of the engine. The intake and exhaust manifolds at the left-hand side of the engine are associated with the cam shaft and valves on the same side, and correspondingly, the right-hand manifolds are associated with the right cam shaft and valves.

Spaced longitudinally of the right cam shaft 18 are intake valve cams 52, one for each cylinder of the engine, and also spaced longitudinally of the right cam shaft, and alternating with the intake valve cams, are exhaust valve cams 54.

The right-hand intake valve cams 52 control operation of the right-hand intake valves 56, and the right-hand exhaust valve cams 54 control operation of the right exhaust valves 58.

On the left cam shaft, left-hand intake valve cams 60 alternate with left exhaust valve cams 62. As in the case of the right cam shaft and its associated valves, a pair of valve cams and valves is associated with each cylinder, with each pair of left-hand valves including one intake and one exhaust valve.

The left-hand valves have been designated at 64, 66, the intake valves being numbered 64 and the exhaust valves being numbered 66.

By reason of the construction illustrated and described, a predetermined increase in engine revolutions per minute, making desirable earlier intake and exhaust valve opening, and longer valve-open period resulting in longer valve-open overlap, will be translated into outward movement to a corresponding extent of the several bob weights of the respective cam shafts. This will in turn be effective to advance the timing of the right cam shaft 18, simultaneously with retardation of the timing of the left cam shaft 20. As a result, the right intake and exhaust valves 56, 58 will open earlier than they will at lower engine speeds, and the left intake and exhaust valves 64, 66 will open later than they will at said lower engine speed. In this way, the cylinder has been opened earlier to the intake system, and has been kept open to the intake system for a longer period of time. The same is true of the exhaust portion of the cycle. Engine performance is thus distinctly improved, and the necessity of setting the timing at a compromise location is obviated.

Of course, low revolutions per minute call for late intake and exhaust valve opening, and short valve-open overlap resulting in short valve-open time. This adjusted timing results by reason of the construction illustrated and described, to accomplish the delayed intake and exhaust valve opening and the shorter valve-open overlap.

It is of importance to note that in its basic aspects, the present invention is the variation of the valve timing in proportion to the increase or reduction of revolutions per minute, to eliminate the compromise settings heretofore required and, in the final analysis, improve engine performance. It is to be further observed that in carrying out this basic idea, I provide two pairs of valves per cylinder, each pair being controlled by a separate cam shaft and including an intake and an exhaust valve, with said cam shafts being so driven as to cause one cam shaft to be advanced in timing simultaneously with retardation of the other, responsively to changes in revolutions per minute. The invention further embodies the timed opening and closing of the several valves associated with each cylinder, to cause coaction of the several valves in such a way as will produce longer or shorter valve-open overlap, depending on whether the engine is operating at high or low speed.

While the above constitutes the basic and essential invention, it is to be noted that the invention further includes a specific means for effecting the desired advancement and retardation of the respective cam shafts, said means being centrifugally controlled at the location at which drive is transmitted to the cam shafts. The illustrated example of said centrifugally controlled cam shaft drive mechanism, provided in Figures 4 and 5, is a presently preferred example of an advance-retard device that can be utilized in the inventive combination. It is believed, however, that other designs may possibly be utilized, within the scope of the appended claims.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. Variable valve timing means for internal combustion engines, comprising, in combination with an engine cylinder: two pairs of valves controlling the cylinder intake and exhaust with each pair including one intake and one exhaust valve; a separate cam shaft for each pair of valves; and drive means for the respective cam shafts including a centrifugally controlled advance for one of the cam shafts and a centrifugally controlled retard for the other cam shaft, for advancing the opening of the valves of one pair simultaneously with retardation of the opening of the valves of the other pair, in proportion to changes in engine speed, said drive means including a centrally apertured cam shaft gear for each cam shaft, a hub disposed within the aperture of said gear and secured to the associated cam shaft, a worm wheel connecting the hub and cam shaft for joint rotation, said worm wheel meshing with the hub and cam shaft gear, and means secured to said worm wheel and responding to centrifugal force to impart rotatable movement to the worm wheel, so as to partially rotate the hub relative to the cam shaft gear.

2. Variable valve timing means for internal combustion engines, comprising, in combination with an engine cylinder: two pairs of valves controlling the cylinder intake and exhaust with each pair including one intake and one exhaust valve; a separate cam shaft for each pair of valves; and drive means for the respective cam shafts including a centrifugally controlled advance for one of the cam shafts and a centrifugally controlled retard for the other cam shaft, for advancing the opening of the valves of one pair simultaneously with retardation of the opening of the valves of the other pair, in proportion to changes in engine speed, said drive means including a centrally apertured cam shaft gear for each cam shaft, a hub disposed within the aperture of said gear and secured to the associated cam shaft, a worm wheel connecting the hub and cam shaft for joint rotation, said worm wheel meshing with the hub and cam shaft gear, and means secured to said worm wheel and responding to centrifugal force to impart rotatable movement to the worm wheel, so as to partially rotate the hub relative to the cam shaft gear, the worm wheels being arranged for rotation of the hub of one cam shaft in one dirertion simultaneously with rotation of the hub of the other cam shaft in an opposite direction, relative to their associated cam shaft gears.

References Cited in the file of this patent

UNITED STATES PATENTS

| Number | Name | Date |
| --- | --- | --- |
| 1,318,542 | Chevrolet | Oct. 14, 1919 |
| 1,533,947 | Riker | Apr. 14, 1925 |
| 1,654,366 | Fedden et al. | Dec. 27, 1927 |
| 1,980,379 | Burnett | Nov. 13, 1934 |
| 2,037,051 | Smiley | Apr. 14, 1936 |
| 2,057,354 | Withers et al. | Oct. 13, 1936 |